US010649874B2

(12) United States Patent
Goettge et al.

(10) Patent No.: US 10,649,874 B2
(45) Date of Patent: May 12, 2020

(54) LONG-DURATION TIME SERIES OPERATIONAL ANALYTICS

(71) Applicant: Teradata US, Inc., Dayton, OH (US)

(72) Inventors: Robert Goettge, Dayton, OH (US); Birendra Kumar Sahu, Trimulgherry (IN)

(73) Assignee: Teradata US, Inc., San Diego, CA (US)

( * ) Notice: Subject to any disclaimer, the term of this patent is extended or adjusted under 35 U.S.C. 154(b) by 593 days.

(21) Appl. No.: 15/386,046

(22) Filed: Dec. 21, 2016

(65) Prior Publication Data

US 2017/0235657 A1 Aug. 17, 2017

Related U.S. Application Data

(60) Provisional application No. 62/272,754, filed on Dec. 30, 2015.

(51) Int. Cl.
| | |
|---|---|
| *G06F 17/30* | (2006.01) |
| *G06F 11/34* | (2006.01) |
| *G06F 11/30* | (2006.01) |
| *G06F 16/25* | (2019.01) |
| *G06F 16/28* | (2019.01) |
| *G06F 16/2458* | (2019.01) |

(52) U.S. Cl.
CPC ...... *G06F 11/3419* (2013.01); *G06F 11/3024* (2013.01); *G06F 11/3452* (2013.01); *G06F 16/2465* (2019.01); *G06F 16/258* (2019.01); *G06F 16/285* (2019.01)

(58) Field of Classification Search
CPC .............. G06F 11/3419; G06F 16/285; G06F 16/2465; G06F 16/258; G06F 11/3024
See application file for complete search history.

(56) References Cited

U.S. PATENT DOCUMENTS

| | | | | |
|---|---|---|---|---|
| 2006/0080364 | A1* | 4/2006 | Lake | G06F 11/3409 |
| 2010/0161810 | A1* | 6/2010 | Vaidyanathan | G06F 11/3006 |
| | | | | 709/228 |
| 2013/0116976 | A1* | 5/2013 | Kanemasa | G06F 11/3419 |
| | | | | 702/186 |
| 2014/0052841 | A1* | 2/2014 | Kanemasa | G06F 9/5083 |
| | | | | 709/224 |
| 2016/0217022 | A1* | 7/2016 | Velipasaoglu | G06F 11/079 |
| 2016/0321257 | A1* | 11/2016 | Chen | G06F 16/783 |
| 2016/0342910 | A1* | 11/2016 | Chu | G06Q 10/063 |
| 2017/0126519 | A1* | 5/2017 | Barry | H04L 43/045 |
| 2017/0139794 | A1* | 5/2017 | Yoshinaga | G06F 11/2257 |

* cited by examiner

*Primary Examiner* — Jared M Bibbee
(74) *Attorney, Agent, or Firm* — Schwegman, Lundberg & Woessner, P.A.

(57) ABSTRACT

Various embodiments herein each include at least one of systems, methods, and software for producing operational analytics that summarize fine-grain time scale behavior over long time durations. Some such embodiments are targeted toward understanding operationally meaningful behavior of complex dynamic systems that are often only apparent at fine-grain time scales. Such behavior occurs rarely and/or only for short durations so the analytics of some embodiments cover long time durations.

17 Claims, 12 Drawing Sheets

| THRESHOLDS | | | | | |
|---|---|---|---|---|---|
| CPU UTILIZATION (1-100%) | Enabled ▶ | Degraded ≥ | 90 | Critical ≥ | 95 |
| USER (1-100%) | Enabled ▶ | Degraded ≥ | 80 | Critical ≥ | 90 |
| SYSTEM (1-100%) | Enabled ▶ | Degraded ≥ | 80 | Critical ≥ | 90 |
| WAIT I/O (1-100%) | Enabled ▶ | Degraded ≥ | 80 | Critical ≥ | 90 |
| NODE CPU SKEW (1-100%) | Enabled ▶ | Degraded ≥ | 80 | Critical ≥ | 90 |
| NODE I/O SKEW (1-100%) | Enabled ▶ | Degraded ≥ | 80 | Critical ≥ | 90 |
| AMP CPU SKEW (1-100%) | Enabled ▶ | Degraded ≥ | 80 | Critical ≥ | 90 |
| AMP I/O SKEW (1-100%) | Enabled ▶ | Degraded ≥ | 80 | Critical ≥ | 90 |
| AMP WORKER TASKS (Tasks) | Enabled ▶ | Degraded ≥ | 48 | Critical ≥ | 52 |

FIG. 2

Alert Name

[Critical]   ☑ Enabled

Alert Rules

[ Trigger if system health is this level or worse  [Critical ▼] ]

Only trigger if alert rule(s) are met for [ 10 ] minutes

Alert Action

[ email ▼ ]

Do not run twice in [ 20 ] minutes

Severity

[ High ▼ ]

*FIG. 3*

LONG-DURATION TIME SERIES OPERATIONAL ANALYTICS

PRIORITY APPLICATIONS

The application claims the benefit of priority to U.S. Provisional Application Ser. No. 62/272,754, filed Dec. 30, 2015, the content of which is incorporated herein by reference in its entirety.

BACKGROUND INFORMATION

In many dynamic systems, such as database management systems, operationally significant behavior occurs at fine time granularity. Optimizing system operational performance and efficiency requires understanding fine-grain behavior over long time durations. This understanding provides visibility into the impacts, patterns, and causes of behavior affecting operational performance. Examples include frequency, duration, and temporal patterns of occurrences of operationally significant fine-grain behavior.

There are many existing methods for understanding dynamic behavior represented by time series. However, when applied over long time durations these methods do not provide visibility into operational behavior: (1) methods are based on coarse-grain numerical statistical summarization over long time durations and mask fine-grain behavior; or (2) methods based on fine-grain numerical techniques do not directly discover operationally meaningful behavior and miss important random, short duration events.

BRIEF DESCRIPTION OF THE DRAWINGS

FIG. 2 illustrates a Viewpoint System Health panel by which operations personnel define criteria for monitoring and categorizing real-time data streams, according to an example embodiment.

FIG. 3 is a user interface illustration, according to an example embodiment.

DETAILED DESCRIPTION

Figure 1:
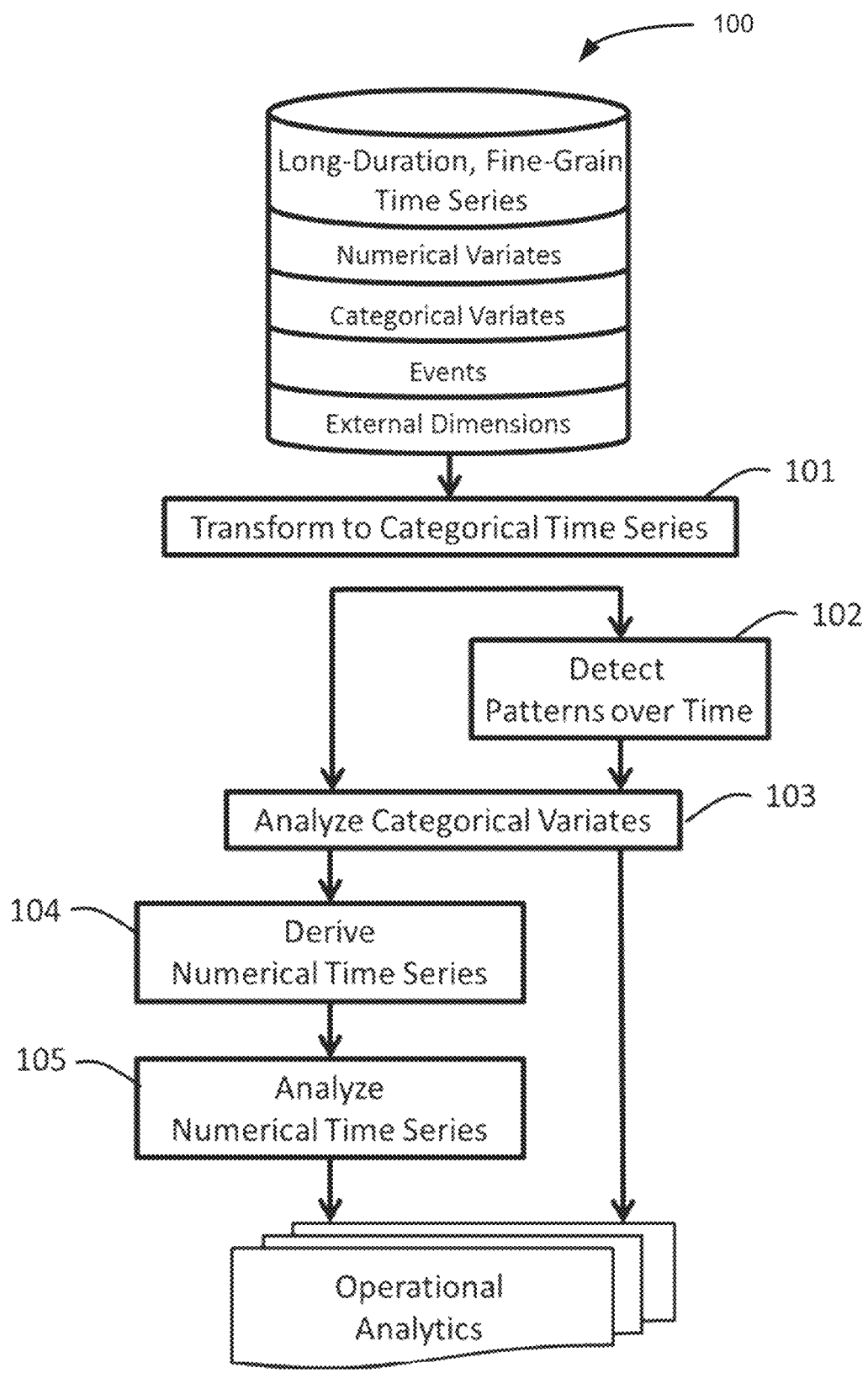
FIG. 1 is a flow diagram of a method, according to an example embodiment.

Various embodiments herein each include at least one of systems, methods, and software for producing operational analytics that summarize fine-grain time scale behavior over long time durations. Some such embodiments are targeted toward understanding operationally meaningful behavior of complex dynamic systems that are often only apparent at fine-grain time scales. Such behavior occurs rarely and/or only for short durations so the analytics of some embodiments cover long time durations.

Some embodiments map fine-grain numerical measurements into one or more operationally meaningful categorical dimensions and calculates a variety of analytics from fine-grain categorical time series. These analytics may include, for example; conditional relative frequencies of categorical variants and measures of association between and across categorical dimensions. Some embodiments also detect temporal patterns and summarizes them over long time durations.

Various embodiments may be implemented in many fields, for example, computer system performance reporting and evaluation. Teradata Database, Aster, and Hadoop are three systems where fine-grain operational analytics are important to a comprehensive understanding of performance over long time durations.

In many dynamic systems, operationally significant behavior occurs at fine time granularity. Optimizing system operational performance and efficiency requires understanding fine-grain behavior over long time durations. This understanding provides visibility into the impacts, patterns, and causes of behavior affecting operational performance. Examples include frequency, duration, and temporal patterns of occurrences of operationally significant fine-grain behavior.

There are many existing methods for understanding dynamic behavior represented by time series. However, when applied over long time durations these methods do not provide visibility into operational behavior: (1) methods are based on coarse-grain numerical statistical summarization over long time durations and mask fine-grain behavior; or (2) methods based on fine-grain numerical techniques do not directly discover operationally meaningful behavior and miss important random, short duration events.

Various embodiments herein overcome such limitations of other solutions through use of categorical analysis techniques rather than numerical techniques. Some such embodiments transform numerical time series data into categorical time series data using operationally defined mappings from numerical values to categories. The categorical analysis then detects operationally significant patterns of behavior. Analytics are based on analysis of categorical patterns over time. Such embodiments maintain a fine-grain perspective across long time durations. The analytics, in some embodiments, inherit operational meaning from the numerical to categorical transformation.

Various embodiments have wide application to many fields. One field is performance of complex computer systems such as Teradata's Database, Aster, and Hadoop systems. Teradata systems have hundreds performance metrics which are monitored and collected in real time at fine time granularly of 1 to 10 minutes over durations of 1 year and more. These systems allow operations staff to define specific patterns of behavior having special operational significance. The method produces analytics which provide visibility into how, when, and how often these patterns occur over long time periods.

Amazon Web Services (AWS) is another example of a widely used computer system which monitors and collects performance measurements at fine granularities over long time durations with its CloudWatch tools.

Teradata (TD) sells a set of tools, Performance Data Collection and Reporting (PDCR), which produce analytics from measurements of TD Database performance. PDCR is used by many customers to understand coarse-grain performance characteristics of their TD Database systems over long time durations. Various embodiments herein complement PDCR's capabilities with its analytics which provide understanding of fine-grain, operationally meaningful behavior over long time durations.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Some embodiments herein include a method for producing operational analytics which summarize fine-grain time scale behavior over long time durations. Some components of this method are: 1) Transforming fine-grain numerical measurements into operationally meaningful categories to form long-duration categorical time series; 2) Using categorical time series analysis to extract fine-grain operational analytics; and 3) Using numerical time series analysis to characterize operational analytics over time.

In some embodiments, such methods mine operational analytics from numerical and categorical time series, discrete and persistent events, and external conditions and attributes. Time series measurements represent, or approximate, variate values over intervals of time. Time granularities are typically fine-grain, the same granularity as real time operational monitoring and notification. Fine time granularity provides visibility into operationally significant system behavior. Time durations are long, providing visibility into both routine and infrequently occurring behavior. Ratios of time duration to time granularity typically range from 20,000 to 100,000.

FIG. 1 is a flow diagram of a method 100, according to an example embodiment. More specifically, FIG. 1 is a flow diagram of a method 100 for mining operational analytics from long-duration, fine-grain time series data.

The method 100, in some embodiments, includes five steps. Step 101 transforms time series data into operationally meaningful categories which results in multiple categorical time series. Events are also transformed into time series by procedures which vary according to the type of event.

Step 102 detects temporal patterns in categorical time series. These "patterns over time" are often operationally meaningful. Detected patterns are recorded as discrete time events for analysis in subsequent steps.

Step 103 applies categorical time series analysis to the time series produced by Steps 101 and 102. Step 103 calculates frequencies of occurrence of categorical values and patterns over time and derives measures of association among categorical variates. The results of Step 103 are numerical analytics computed as aggregate metrics for segments of time. Step 104 derives numerical times series from the analytics produced by Step 103, providing them to Step 105 for analysis.

Step 105 calculates additional analytics from the numerical times series of step 104. Its analytics summarize the operationally meaningful analytics of Steps 103 over long time durations.

The steps of the method 100 result in broad quantitative analytics which characterize operationally meaningful behavior over long time durations.

With further regard to step 101 of the method 100, this step 101 in some embodiments transforms mixed numerical/categorical measurements into exclusively categorical time series. Measurements are mapped to a common time series structure that allows for correlation between coincident variates. Fine time granularity is preserved to permit association with operationally meaningful categories.

Typically, many measurements will be in the form of numerical time series. This step 101 may employ a number of techniques for transforming variates from numerical to categorical. The step 101 may also map discrete events into a common time series structure. Finally, the step 101 may build time series for variates from other operationally meaningful dimensions such as calendar categories.

Numerical time series data are recordings of real-time measurements of system metrics. Typically, many of these system metrics have operational importance. They may be monitored in real-time where different ranges of values have operationally defined criteria for association with operationally meaningful categories. Depending on the extent and temporal pattern of categories in real-time, notifications may be generated and actions taken. Metrics which are recorded but not monitored can also be associated with operationally meaningful categories.

An example of operational monitoring of numerical data and conversion to categorical data is provided by Teradata (TD) Viewpoint. Viewpoint may be configured to collect, monitor, and record many different system metrics from TD Database, Aster, and Hadoop systems. FIG. 2 illustrates a Viewpoint System Health panel by which operations personnel define criteria for monitoring and categorizing real-time data streams, such as from a TD Database, according to an example embodiment. Operations personnel may specify two thresholds which are used as criteria for categorizing measurement values as Normal, Degraded, or Critical. Measurements may be monitored and categorized once per minute or other period, and values are recorded at the same frequency.

In some embodiments, the method 100 uses categorization criteria defined for real time operations to transform numerical values in recorded numerical time series into categorical values. The result is a new categorical time series of operationally meaningful categories.

In the case when real-time categorization criteria have not been specified, the method 100 may use threshold specifications set by operations staff for off-line processing. Alternately, the method 100 may use one of many available statistical techniques for defining thresholds which are used for categorization of values in numerical time series. These techniques define a small number of categories which capture normal and abnormal ranges of values. Even though they are not defined by operations staff, these do reflect operational conditions. One such technique for discretization and categorization of numerical time series is SAX, Symbolic Aggregate approximation, which is used in TD Aster.

Frequently, numerical measurements may include one or more categorical attribute dimensions. Thus, a metric's measurement at a single time point may be repeated for different values of its attributes. The method 100 may duplicate these attribute categories in some embodiments, combining them with the transformed numerical measurements resulting in multiple categorical time series. Attributes may be used by the method 100 to segment time series, selecting one combination of attributes to form individual transformed time series. In cases where categorization criteria do not apply to segmented data, the method 100 may use an alternative statistical approach for transforming the numerical measurements to categorical.

The method 100 may continue to processes time series that are already in categorical form. Typically, these time series do not require additional transformation.

Many operationally important changes are recorded as events. For example, times when a persistent condition changes from one category to another are recorded as events. The method 100 in some embodiments, converts a persistent change event into a time series whose categorical values at any time point after the change is the persistent condition. If the event is important for reasons other than condition change, the method uses the techniques described below with regard to individual events. Examples of condition change events in TD Database are changes in system state, software version, and TASM rule set.

There are many operationally important events which do not cause condition changes. For these events, the method 100 may transform event-time pairs into a time series of counts of number of occurrences of the event per time interval. The result is a numerical time series. An example of a transformation is converting the number of events in an interval to the binomial variate values "no events occurred in time interval" and "one or more events occurred in the time interval". The method 100 may use this coding because many events occur rarely so the coding reduces to an event "did occur" or "did not occur" in an interval.

The method 100 may also add dimensions to measurements in categorical time series to include additional operationally meaningful attributions.

Systems related or responsive to human activity are often strongly influenced by calendar categories associated with time series intervals. The method 100 may construct separate calendar time series as categorical time series of vectors describing calendar attributes at each time point. Calendar attributes may include year_of_calendar, month_of_year, day_of_month, hour_of_day, and others. The method's 100 calendar time series can also include weekday, weekend, holiday, and other time attributes such as morning, afternoon, evening, and night. The method 100 may use one or more calendar time series in associating calendar attributes with categorical variates.

With regard to the detecting of temporal patterns in categorical time series of step 102 of the method 100, temporal patterns of categorical values often have operational significance. Some embodiments include analytics associated with these 'patterns over time' as they occur in long-duration time series.

An example of an operationally important temporal pattern is consecutive occurrences of a single categorical value. Such "runs" may be especially important for rarely occurring values of categorical variates since purely random occurrences of a long run are very unlikely. Monitoring tools often allow operations staff to specify minimum run lengths for monitored metrics before triggering notifications and alerts. An example from TD Viewpoint is shown in FIG. 3 where 10 minutes of consecutive Critical system health observations are required to send an email notification. FIG. 3 is a user interface illustration, according to an example embodiment.

The method 100 detects runs in categorical time series having lengths at least as long as specified by operations staff. Alternately, the method 100 determines a suitable minimum run length statistically. It records occurrences of runs as events with variate category name, start time, and run length.

An example of a run pattern from TD Database is consecutive occurrences of a MISSED response service level goal (SLG). The method 100 may find all MISSED SLG runs greater than a specific length, recording their start times and run lengths. For this example, the minimum run length is 10, a length considered to be operationally significant. The method 100 searched nearly 57,422 measurements of response time service levels and found 200 SLG MISSED run patterns of length 10 or greater. The below table provides the times and lengths of the some of the longest runs of SLG MISSED.

| Start Date/Time | Run Length |
| --- | --- |
| Apr. 23, 2014 15:42 | 32 |
| Oct. 8, 2014 12:47 | 26 |
| Sep. 26, 2013 14:43 | 25 |
| Jul. 1, 2014 15:25 | 25 |
| Oct. 2, 2013 13:52 | 24 |
| Oct. 3, 2013 13:44 | 21 |
| Oct. 7, 2013 13:20 | 21 |

Figure 4:
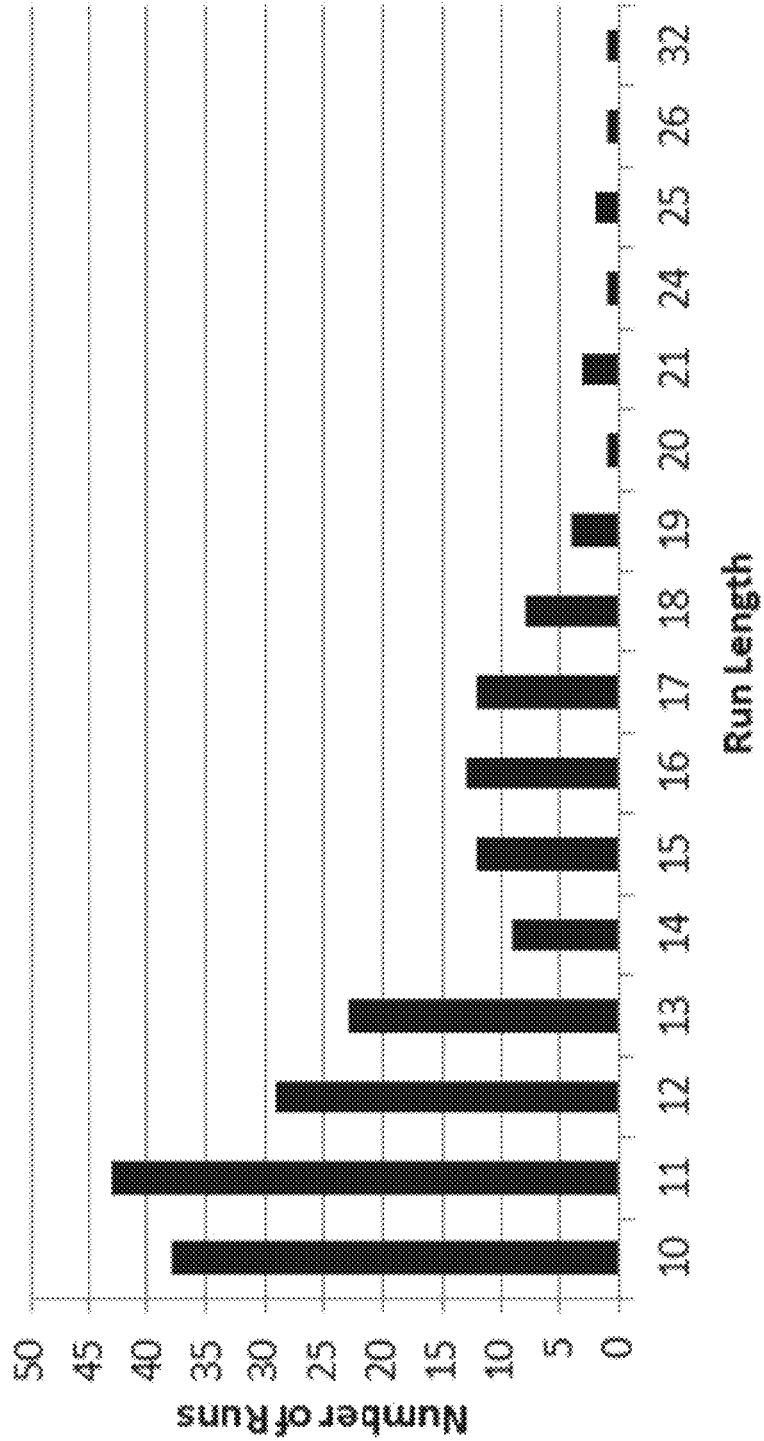
FIG. 4 illustrates a distribution of long run length patterns, according to an example embodiment.

The distribution of lengths of the 200 long run length patterns is shown as a histogram in FIG. 4.

The method 100 may construct a new "long run" categorical time series from the detected long run events. In the example, the new time series has the categorical variate 'SLGMISSED'. For each detected long run event the method 100 may assign 'S' to the event's start time point, 'E' to the end time point of the run, 'C' to points interior to the run, and 'N' otherwise. The 'S' and 'E' are helpers for analytics which count the number of runs. The 'C' isFfi a helper for analytics which measure the degree of association between runs and other categorical variates.

In the example there are 200 runs (the total in the histogram of FIG. 4) for which the method 100 would record 'S', 'C', and 'T' for 'SLGMISSED'. The 200 runs consist of 2,653 distinct time points that would be marked with one of the three. The method would code the remaining 95.3% of time points as 'N'.

The method 100, in step 103 to analyze categorical variates, applies categorical time series analysis to the time series produced by Steps 101 and 102. The method 100 calculates frequencies and relative frequencies of occurrence of categorical values and patterns over time. The method 100 derives measures of association among variates (typically pairs of variates). The method 100 analytics are segmented by attribute, notably calendar categories. When the segmentation criteria are calendar categories, the term "aggregated by" is frequently used as in "last year's measurements are aggregated by month".

Because categories may have operational significance, so do analytics which measure the frequency of occurrences of operationally meaningful variate values and correlations among them. The analytics are summaries of what happened of operational significance at fine time granularity over long time durations.

The method 100 may calculate two simple yet very important analytics for each categorical variate time series: (1) frequency of occurrence of categorical values and (2) derived relative frequencies.

Below is an example of the method's calculation of frequency and relative frequency of occurrence. The data for this example was recorded system in the PDCR table "ResUsageSum10_Hst". The example variate is average CPU Utilization sampled at 10 minute intervals over 13 months. Each interval is assigned a category of Healthy, Degraded; or Critical by:

Healthy: CPUUtil<=95%;
Degraded: CPUUtil>95% and <=99%; and
Critical: CPUUtil>99%.

The method's 100 calculated frequencies and relative frequencies for the three category values are:

| CPU Utilization | Frequency (Counts) | Relative Frequency |
|---|---|---|
| Healthy | 56543 | 98.47% |
| Degraded | 715 | 1.25% |
| Critical | 164 | 0.29% |
| Total | 57422 | 100.00% |

Frequency and relative frequency are analytics for aggregated subsets of time intervals in time series. In the case above, the "subset" is the total set of 57,422 10 minute intervals. The method 100 in some embodiments can calculate analytics for any subset of points. Particularly useful is segmentation of the total time into subsets of intervals defined by calendar category boundaries.

Figure 5:
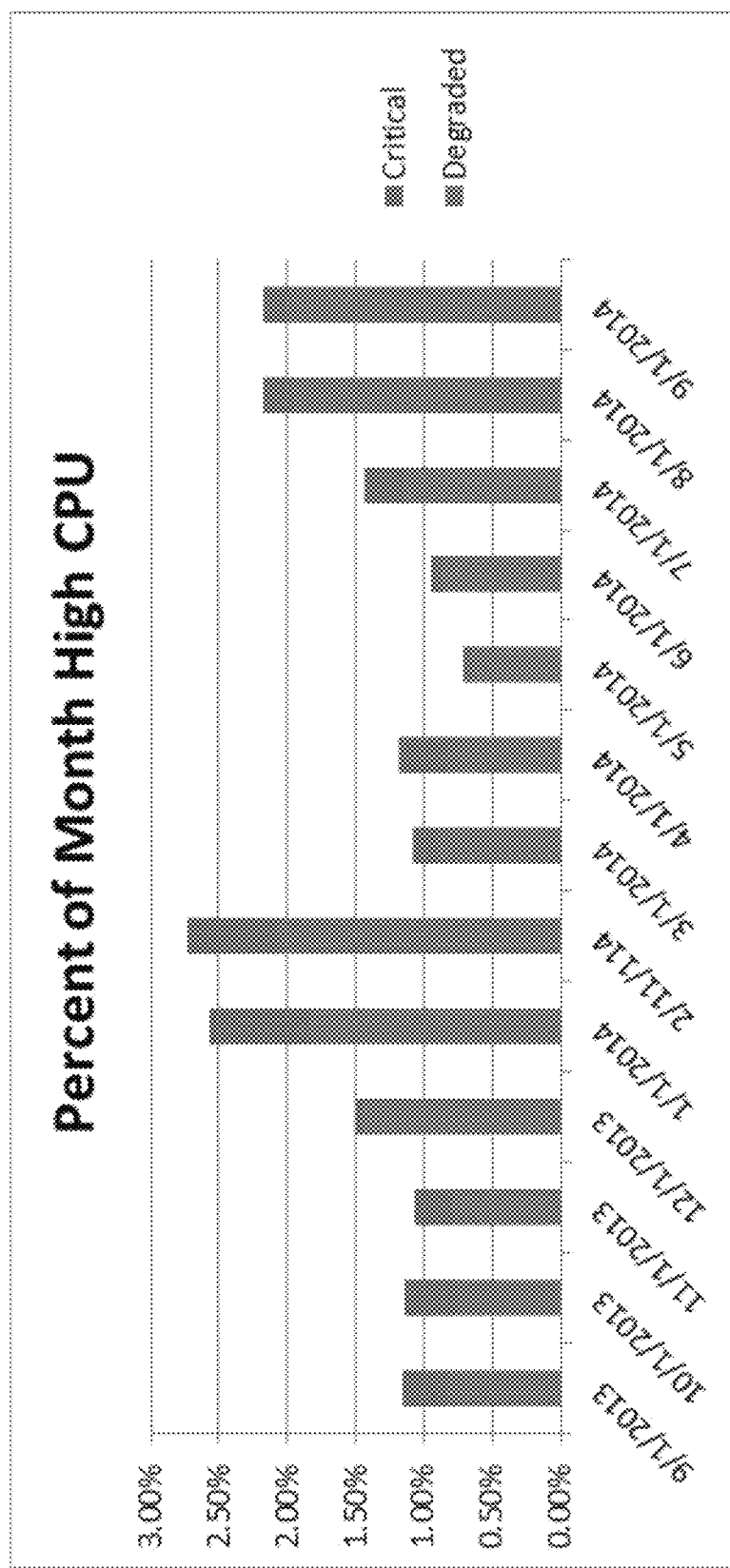
FIG. 5 illustrates frequency data segmented by calendar year/month, according to an example embodiment.

The chart in FIG. 5 shows CPU relative frequency of Degraded and Critical CPU Utilization segmented by calendar year/month.

The analytics shown in FIG. 5 summarize 879 fine-grain Degraded and Critical categorical values of the total 57,422. Real time operational monitoring would show a "RED" status 28 times per day on average. FIG. 5 reveals large variations between months. The difference in high utilization time between November 2013 and February 2014 is a factor of 250%. These fine-grain variations do not show in coarse grain analytics for average monthly CPU utilization shown in FIG. 6. The difference in total CPU utilization between the two months is very small, only 5%.

Figure 6:
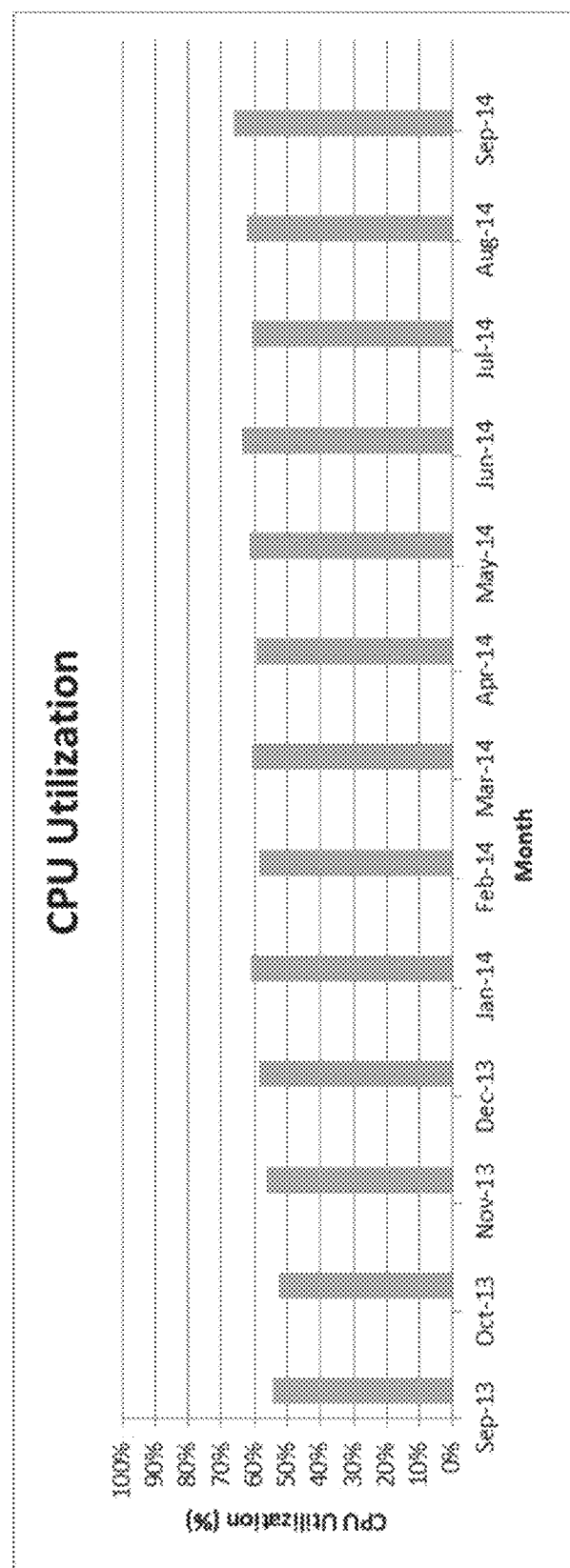
FIG. 6 illustrates frequency data segmented by calendar year/month, according to an example embodiment.

However, the differences between FIG. 5 and FIG. 6 also demonstrate their complementary nature. FIG. 5 summarizes fine-grain behavior, essential for understanding operationally significant events. FIG. 6 shows coarse-grain behavior, essential for capacity assessment and planning. The fine-grain analytics and coarse grain analytics such as those provided by TD PDCR are entirely complementary. Both may be utilized in some embodiments to provide a comprehensive understanding of performance.

Figure 7:
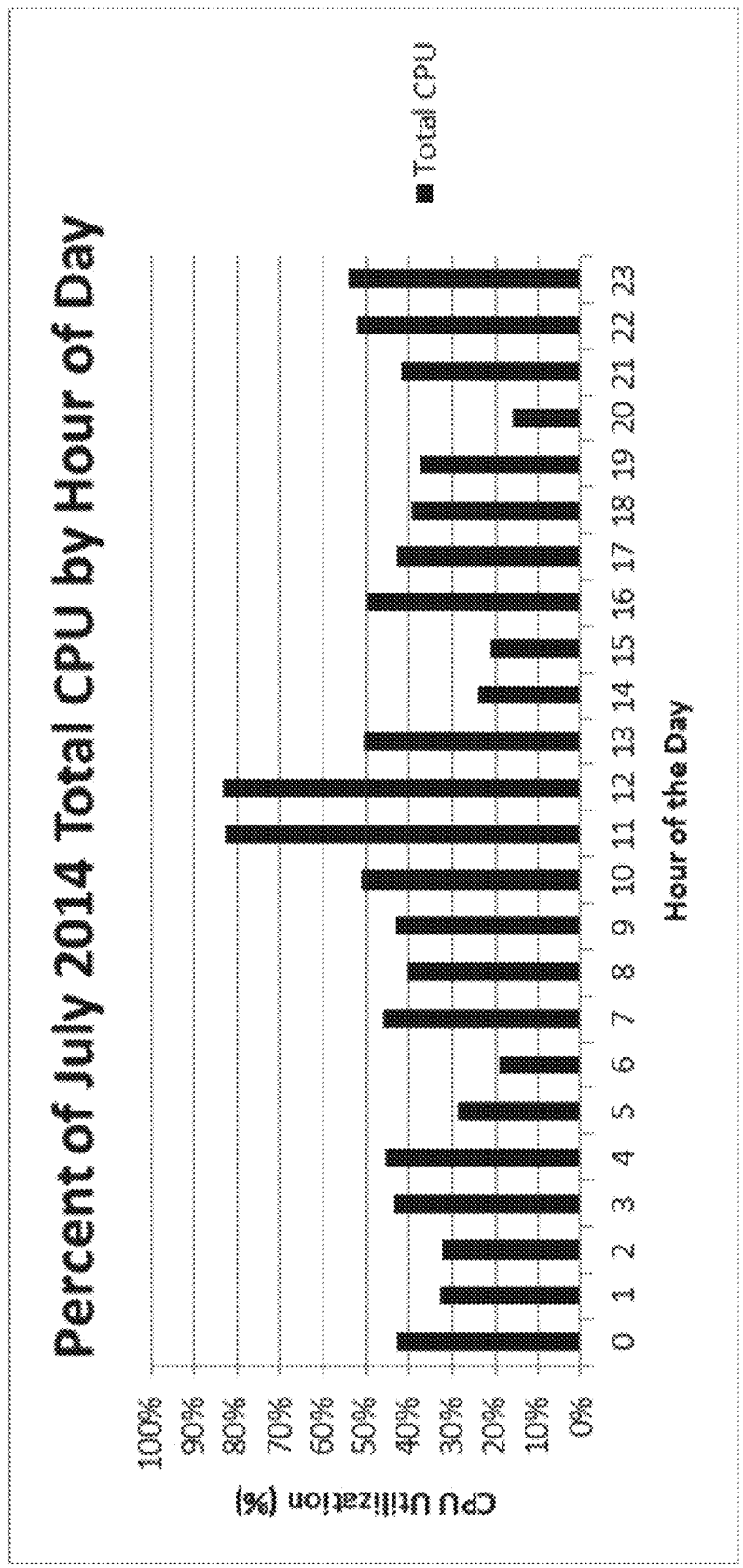
FIG. 7 and FIG. 8 provide illustrations of time series data, according to some example embodiments.
Figure 8:
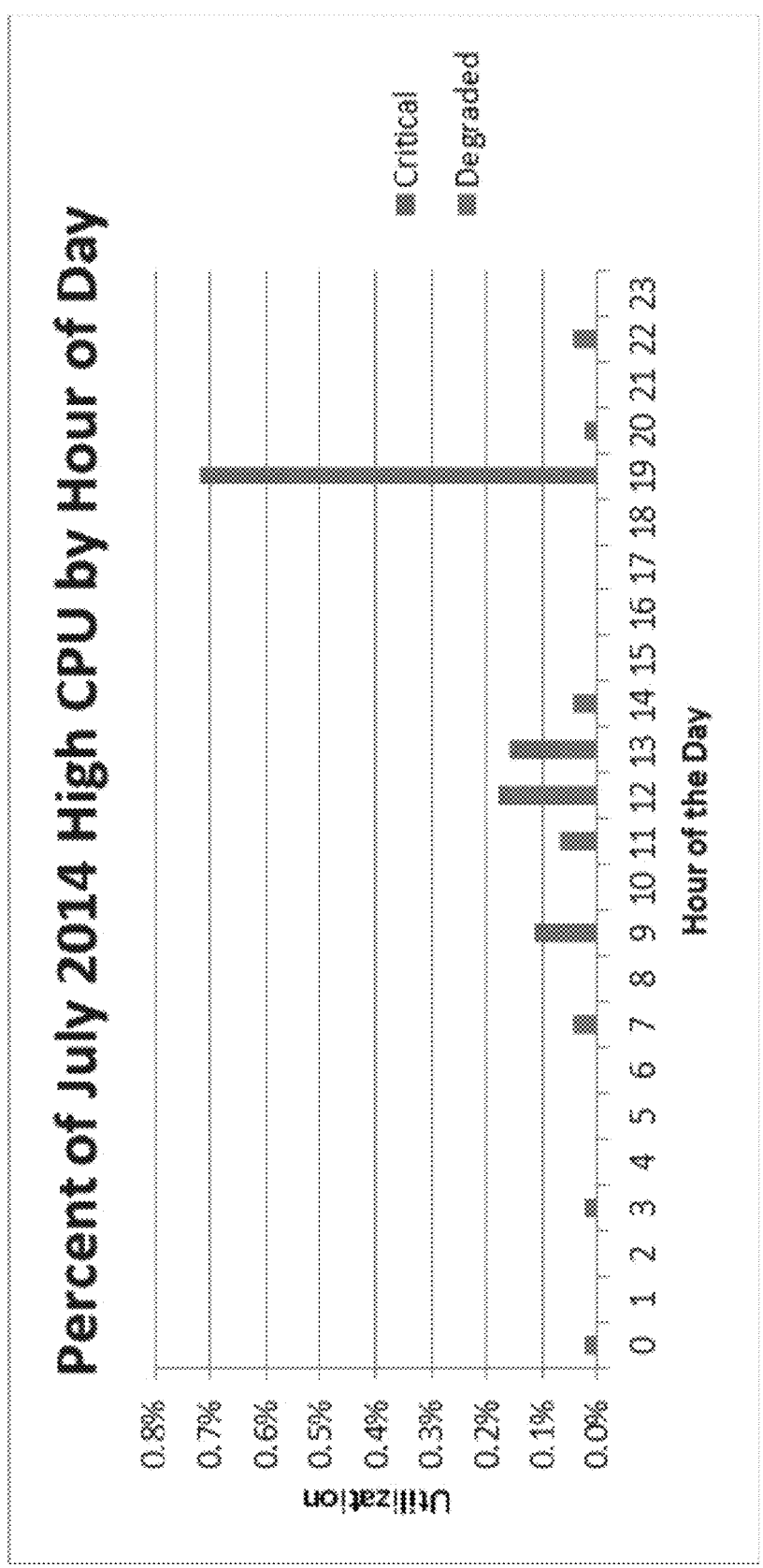
Figure 9:
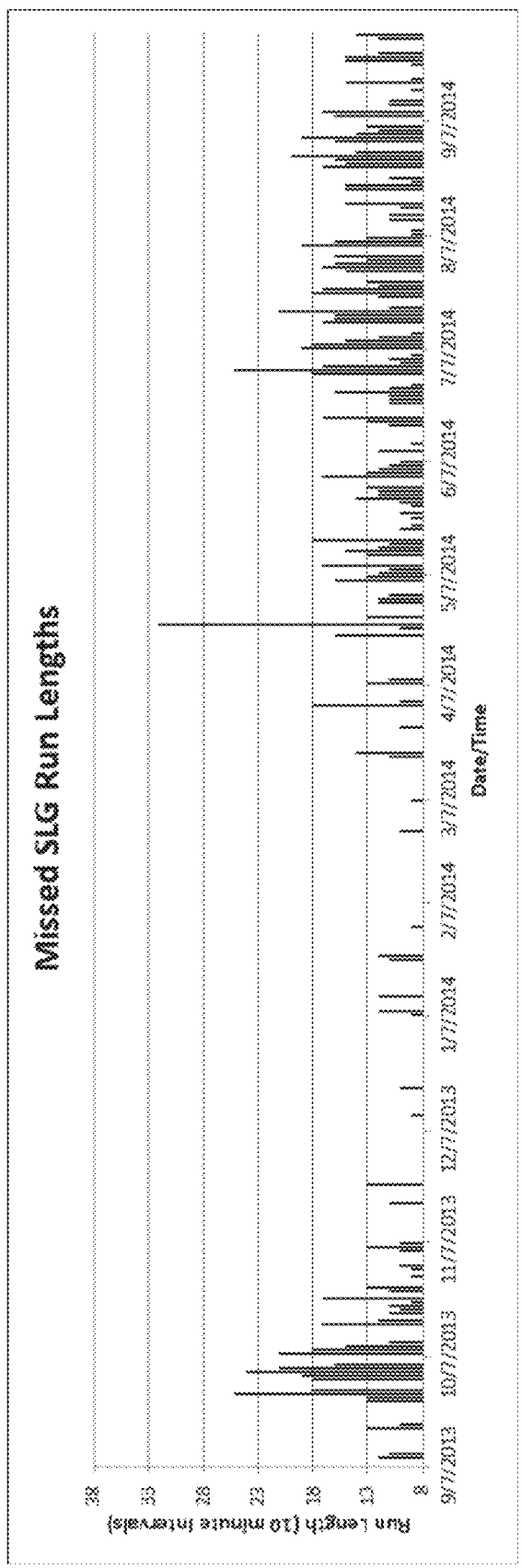
FIG. 9 illustrates a data visualization, according to an example embodiment.

The method 100 may also segment analytics using segmentation criteria applied hierarchically, such as two or more segmentation criteria. For the calendar segmentation above, the method 100 may calculate analytics by month of the year and then hour of the day. The result of the dual segmentation is shown for July 2014 in FIG. 7 (Total CPU Utilization) and FIG. 8 (High CPU Utilization). FIG. 7 and FIG. 8 illustrate that the peak hours for total utilization were 11 and 12 (FIG. 7) but the peak hour for high utilization was hour 19 (FIG. 8).

Returning to the detecting of patterns over time of step 102, the method 100 may calculate several primary analytics which summarize the patterns of long runs of consecutive variate values detected in Step 102. All of these analytics are aggregate values for time segments, e.g., calendar segments. They are:

number of run starts and completions in a segment:
total length of runs in a segment; and
average time per run for runs completing in a segment.

The method 100 may also calculate the average and maximum concurrency of long runs during a time segment. Concurrency is the number of runs active at a time point in a time segment. Average concurrency is calculated both by (1) averaging across all times in a segment and (2) averaging across only those times where concurrency is at least 1.

The method 100 may also produce analytics descriptive of the strength of association between categorical variables. All calculations may be based on contingency tables which present counts for pairs of coincident measurements. The method 100 in such embodiments calculates all pairwise association analytics for selected variates. This approach is similar to that used in TD Aster's Correlation statistical analysis.

The method 100 may correlate multiple categorical time series. This may include calculating several analytics which quantify correlation, such as multidimensional relative frequencies, conditional frequencies, and measures of two-way association.

The following table shows an example of a two dimensional, 2 by 2 contingency table for CPU utilization Health and MISSED SLG. The numbers in the cells are joint occurrence frequencies.

|  |  | CPU | | | |
|---|---|---|---|---|---|
|  |  | Healthy | Degraded | Critical | Total |
| SLG | MET | 50141 | 247 | 64 | 50452 |
| SLG | MISSED | 6402 | 468 | 100 | 6970 |
|  | Total | 56543 | 715 | 164 | 57422 |

This table shows the contingency table which tallies the relative frequencies for each pair of CPU/SLG observations.

|  |  | CPU | | | |
|---|---|---|---|---|---|
|  |  | Healthy | Degraded | Critical | Total |
| SLG | MET | 87.32% | 0.43% | 0.11% | 587.86% |
| SLG | MISSED | 11.15% | 0.82% | 0.17% | 12.14% |
|  | Total | 98.47% | 1.25% | 0.29% | 100.00% |

Such data as in the two tables above may be used by the method 100 to derive conditional relative frequencies. For example, the table below shows conditional relative frequencies of SLGMISSED given CPU Utilization value. The table shows that SLGs are much more likely to be missed when CPU utilization is high than healthy.

| | |
|---|---|
| RelFreq(SLGMISSED\|CPUHealthy) | 11.3% |
| RelFreq(SLGMISSED\|CPUDegraded) | 65.5% |
| RelFreq(SLGMISSED\|CPUCritical) | 61.0% |

However, the following table shows that a MISSED SLG is very likely to have occurred when the CPU is Healthy. Therefore, the correlation of SLGMISSED and CPU appears to be small. A two-sided measure of association between SLGMISSED and CPU High (both Degraded and Critical) may provide insight into the degree of associations between the two categorical variates.

| | |
|---|---|
| RelFreq(Healthy\|MISSED) | 91.9% |
| RelFreq(Healthy\|MET) | 99.4% |

The method 100 may further calculate a complete measure of association, the Phi coefficient. The Phi coefficient may range from 0 (no association) to 1 (perfect positive association) to −1 (perfect negative association) The Phi coefficient for the example is +0.20, a positive correlation which is very small. This supports observation from conditional relative frequencies that the association is small.

The method 100 may also calculate the Cramer's V measure of association for n by m pairwise contingency tables where n and m are the number of possible values for the two categorical variates. (The Phi coefficient is only applicable to the case where each variate is binomial.)

Visual analysis of categorical time series can be used in some embodiments to support change detection analysis and analytical reasoning. The goal of visual analysis in such embodiments is to gain understanding and answer important questions using categorical data, facts, and patterns which are not predictive. Typical steps in some visual analysis embodiments includes operations such as (1) filtering to focus on items of interest, (2) sorting to rank and prioritize, (3) grouping and aggregating to summarize, (4) creating on-the-fly calculations to express numbers in useful ways, and (5) detecting the effective and ineffective actions which cause changes in system behavior.

A simple visualization of long runs of MISSED SLG is shown in 9. Visual analysis would easily determine concentrations of long runs over the 13 months, repetitive weekly patterns, and range of run lengths. Superposition of categories such as software release version could be easily incorporated. Teradata's PDCR and Viewpoint provide tools for visual analysis that are consistent with the data and analytics of the various embodiments herein.

Continuing with further details of some embodiments of the method 100, the results of Step 103 may be numerical analytics computed as aggregate metrics for segments of time. Numerical time series analysis of these time series can produce operationally meaningful summary analytics. Step 104 derives numerical times series from the analytics produced by Step 103, providing them to Step 105 for analysis.

To derive numerical time series, the method 100 may associate the analytic for each time segment with the segment's start time thus producing a time series of values of the analytic. When the analytic is further segmented by a smaller time segment multiple time series are produced by the method 100, one for each smaller time segment. For example, if the top level time segmentation is by week and the lower level time segmentation is by day, the method 100 produces 7-time series, one for each day of the week.

Step 104 produces long-duration time series of numerical analytics. The method 100 derives additional analytics from these numerical times series. In effect, step 105 produces analytics which summarize the operationally meaningful analytics of Step 103 and 104 over long time durations.

The method 100 may produce summary statistics of the numerical time series over long time durations. These often have limited value for use cases such as updating analytics every calendar quarter or when there are system changes. More valuable are summary analytics based on multiple, shorter time segments.

The method 100 calculates summary analytics using multiple time segment granularities. Typically, the most useful granularities are month, week, and day. Summary analytics at these granularities provide 12 to 365-time series points per year. Monthly and weekly granularities provide data for trending and correlation of operational analytics. Weekly and daily granularities provide data for change detection.

The method 100 regresses numerical analytics on time. The result is a linear regression line and a measure of goodness of fit. If the linear regression fits the data well the slope of the line can be used as an estimate of the amount the analytics varies per unit of time.

Figure 10:
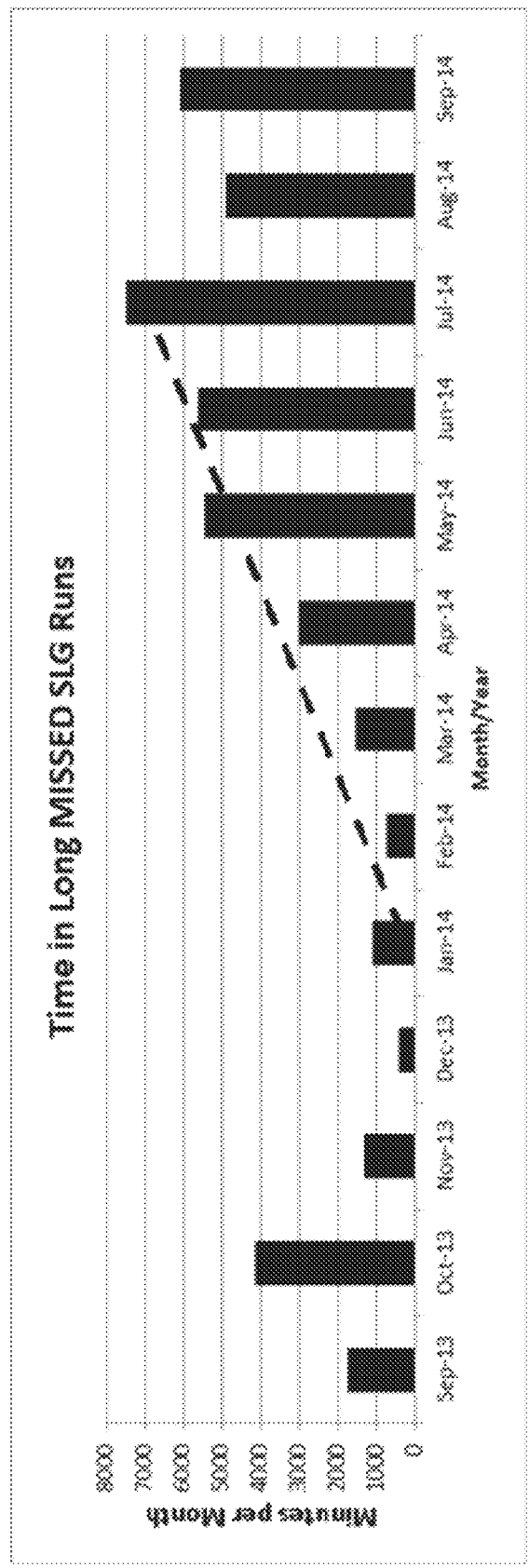
FIG. 10 illustrates a data visualization, according to an example embodiment.

FIG. 10 shows the total length of time spent in long runs of MISSED SLG by month for 13 months. The dashed line is a linear regression for the first half of 2013. The slope of the regression line shows time in MISSED SLG runs was increasing at a rate of 1000 minutes per month. FIG. 10 also shows that the increase stopped in August of 2013 but the levels remained much higher than the end of 2013.

The method 100 calculates analytics which detect changes. The method 100 may determine the likelihood of an observable change or not at a specified time point. It also identifies time points where the time segmented data indicate a probable change. The method 100 may use any of several algorithms for change detection. One algorithm used by the method 100 in some embodiments is Memory Based CUmulative SUM (MB-CUSUM).

Figure 11:
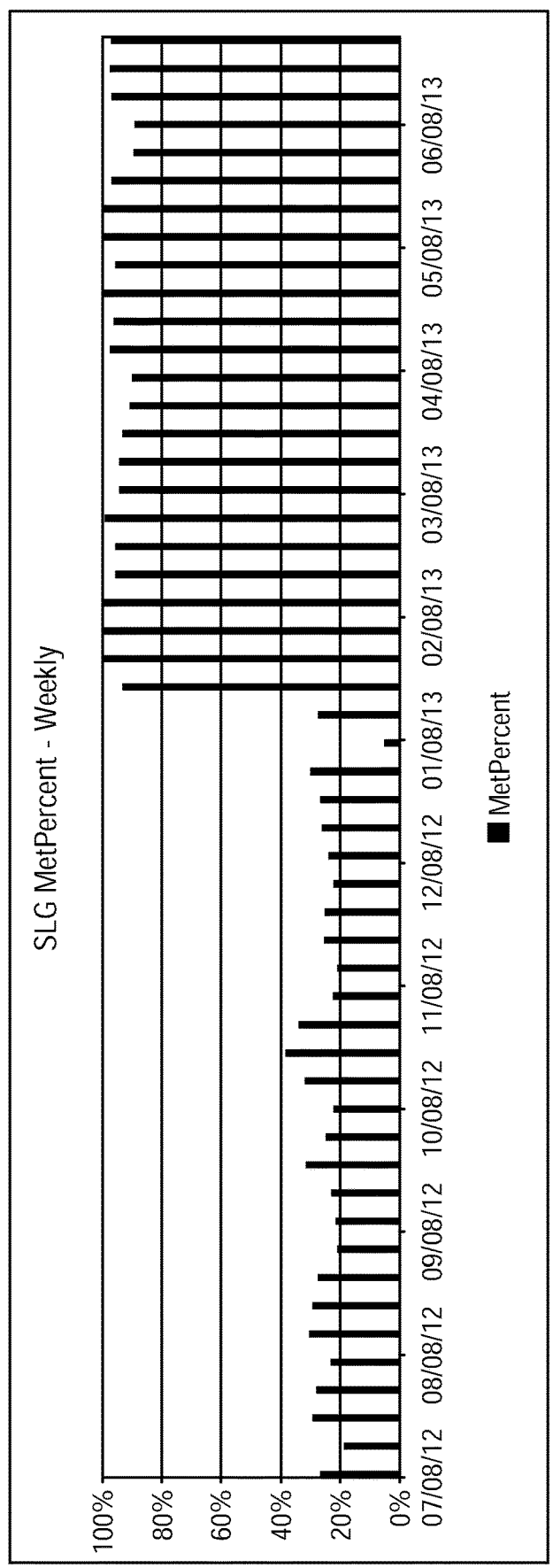
FIG. 11 illustrates a data visualization, according to an example embodiment.

FIG. 11 shows an example time series where changes can be detected. The analytic is percent of time when SLGs were MET. (The complementary analytic, SLGMISSEDPercent, has been termed "degraded downtime"). This analytic is segmented by calendar week. The method 100 may operate to detect an abrupt change in mid-January 2013. The method 100 could be applied to finer segmentation by day or hour to pinpoint the time of the change.

The method 100 may calculate correlation between pairs of numerical time series. A pair of time series may consist of two of the analytic time series derived in Step 104. A pair time series may also include one series of operational analytics from Step 104 and one numerical time series summarizing coarse grain behavior produced by another method, e.g., by Teradata. PDCR's statistical summarization method.

The various embodiments of the method 100 herein, which may also be implemented as a system, subsystem, software, and the like, operates to produce analytics that characterize fine-grain behavior of long time duration. One advantage of some such embodiments is that its analytics are operationally meaningful. For example:

"Bursts of missed service level goals have been increasing at 15% for the past 6 months";

"Critical CPU warnings were 4 times higher than average for Monday mornings in July"; and "Incidents of low AWT availability decreased significantly when COD was increased".

These methods are innovative in transforming both time series dimensions and metric and time, into categories with operational meaning. Such embodiments may utilize operationally defined criteria for mapping numerical variates into a small number of categories. Such embodiments may also utilize operational criteria for detecting temporal patterns of categorical values. A further benefit of the transformation in some embodiments is dimensional reduction in both time series dimensions. These dimensional reductions allow some such embodiments to easily compute analytics for individual and multiple metrics.

Categorical analysis at the finest level of time detail produces operationally meaningful fine-grain analytics. Statistical summarization of fine-grain analytics provides understanding of operational behavior over long time durations. The sequence of "mine, then summarize" used herein can provide important new analytics not available with a "summarize, then mine" paradigm. Some such embodiments complement existing methods to provide a comprehensive view of system behavior over long time durations.

Figure 12:
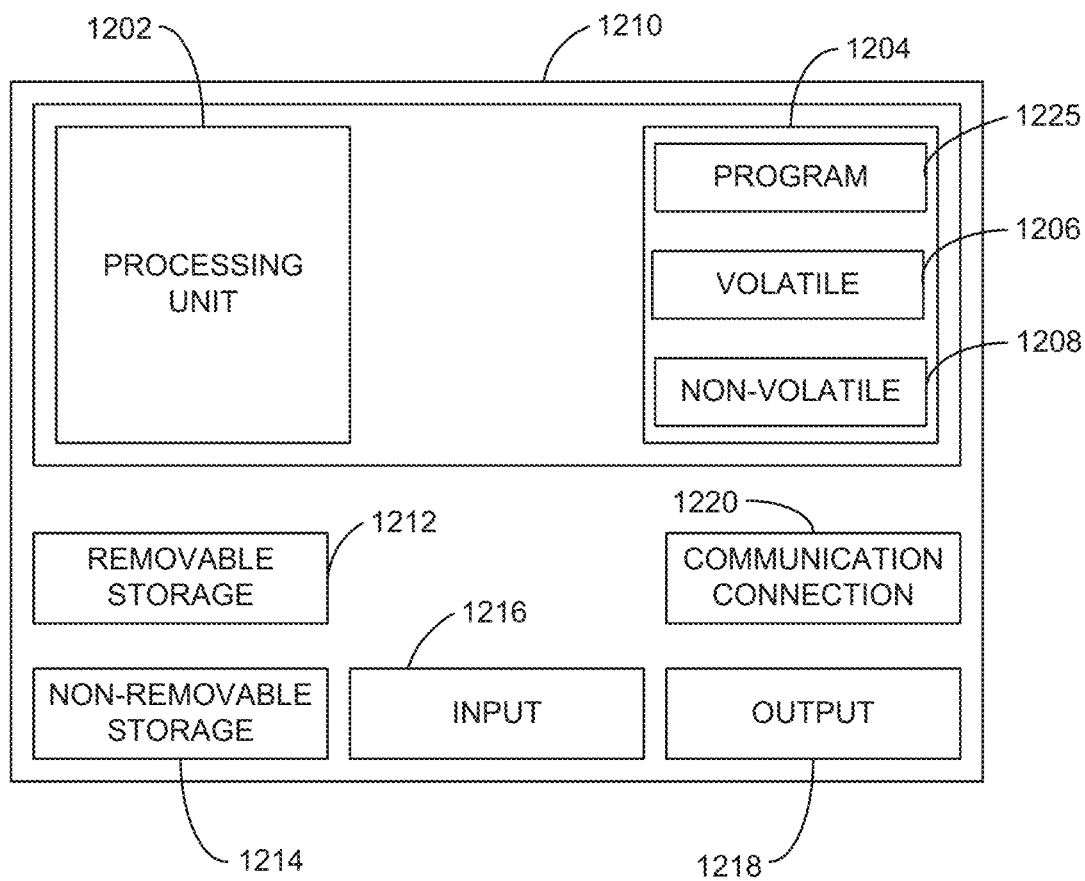
FIG. 12 is a block diagram of a computing device, according to an example embodiment.

FIG. 12 is a block diagram of a computing device, according to an example embodiment on which various embodiments herein, such as the method 100, may be performed and executed. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 1210, may include a processing unit 1202, memory 1204, removable storage 1212, and non-removable storage 1214. Memory 1204 may include volatile memory 1206 and non-volatile memory 1208. Computer 1210 may include—or have access to a computing environment that includes—a variety of computer-readable media, such as volatile memory 1206 and non-volatile memory 1208, removable storage 1212 and non-removable storage 1214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1210 may include or have access to a computing environment that includes input 1216, output 1218, and a communication connection 1220. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1202 of the computer 1210. A hard drive, CD-ROM, and RAM are some examples of articles including a non-transitory computer-readable medium. For example, a computer program 1225 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 1210 to provide generic access controls in a COM based computer network system having multiple users and servers.

It will be readily understood to those skilled in the art that various other changes in the details, material, and arrangements of the parts and method stages which have been described and illustrated to explain the nature of the inventive subject matter may be made without departing from the principles and scope of the inventive subject matter as expressed in the subjoined claims.

What is claimed is:

1. A method comprising:
   transforming time series data into operationally meaningful categories which results in multiple categorical time series, the transforming including transforming of event data into time series data;
   detecting temporal patterns in the categorical time series data;
   recording detected temporal patterns as discrete time events for subsequent analysis;
   applying categorical time series analysis to the previously generated time series to calculate frequencies of occurrence of categorical values and patterns over time;
   deriving measures of association among categorical variates;
   calculating additional analytics from the derived measures of association among the categorical variates;
   transforming mixed numerical and categorical measurements of the time series data into exclusively categorical measurements; and
   mapping the time series data to a common time series structure.

2. The method of claim 1, wherein the time series data is recorded and stored by atleast one database management system performance monitoring process.

3. The method of claim 1, wherein the common time series structure includes fine time granularity to preserve operationally meaningful categories that occur over a short interval.

4. The method of claim 1, wherein the detecting of temporal patterns includes associating coincident variates present in the common time series structure.

5. The method of claim 1, wherein detecting temporal patterns in the categorical time series data includes detecting a pattern as defined in configuration data, the pattern defined by a series of categorical values or a number of occurrences of one or more categorical value within a certain period within the categorical time series data.

6. The method of claim 5, wherein at least one temporal pattern is defined based on a service level goal, an occurrence of which indicates a service level goal violation.

7. The method of claim 1, wherein calculating additional analytics from the derived measures of association among the categorical variates includes summarizing the calculated frequencies of occurrence of the categorical values and patterns over time based on the derived measures of association among categorical variates over an extended time period as defined in either a configuration setting or as bounded by available data.

8. A computer-readable storage medium, with instructions stored thereon that are executable by a computer process to perform data processing activities comprising:
- transforming time series data into operationally meaningful categories which results in multiple categorical time series, the transforming including transforming of event data into time series data;
- detecting temporal patterns in the categorical time series data;
- recording detected temporal patterns as discrete time events for subsequent analysis;
- applying categorical time series analysis to the previously generated time series to calculate frequencies of occurrence of categorical values and patterns over time;
- deriving measures of association among categorical variates;
- calculating additional analytics from the derived measures of association among the categorical variates;
- transforming mixed numerical and categorical measurements of the time series data into exclusively categorical measurements; and
- mapping the time series data to a common time series structure.

9. The computer-readable storage medium of claim 8, wherein the time series data is recorded and stored by at least one database management system performance monitoring process.

10. The computer-readable storage medium of claim 8, wherein the common time series structure includes fine time granularity to preserve operationally meaningful categories that occur over a short interval.

11. The computer-readable storage medium of claim 8, wherein the detecting of temporal patterns includes associating coincident variates present in the common time series structure.

12. The computer-readable storage medium of claim 8, wherein detecting temporal patterns in the categorical time series data includes detecting a pattern as defined in configuration data, the pattern defined by a series of categorical values or a number of occurrences of one or more categorical value within a certain period within the categorical time series data.

13. The computer-readable storage medium of claim 12, wherein at least one temporal pattern is defined based on a service level goal, an occurrence of which indicates a service level goal violation.

14. The computer-readable storage medium of claim 8, wherein calculating additional analytics from the derived measures of association among the categorical variates includes summarizing the calculated frequencies of occurrence of the categorical values and patterns over time based on the derived measures of association among categorical variates over an extended time period as defined in either a configuration setting or as bounded by available data.

15. A system comprising:
- at least one computer processor, at least one network interface device, and at least one memory device; and
- instructions stored on the at least one memory device that are executable by the at least one computer process to perform data processing activities comprising:
  - transforming time series data into operationally meaningful categories which results in multiple categorical time series, the transforming including transforming of event data into time series data;
  - detecting temporal patterns in the categorical time series data;
- recording detected temporal patterns as discrete time events for subsequent analysis;
  - applying categorical time series analysis to the previously generated time series to calculate frequencies of occurrence of categorical values and patterns over time; and
  - deriving measures of association among categorical variates; and
- calculating additional analytics from the derived measures of association among the categorical variates;
- wherein the time series data is recorded and stored by at least one database management system performance monitoring process; and
- transforming the time series data into operationally meaningful categories includes:
  - transforming mixed numerical and categorical measurements of the time series data into exclusively categorical measurements; and
  - mapping the time series data to a common time series structure.

16. The system of claim 15, wherein:
- the common time series structure includes fine time granularity to preserve operationally meaningful categories that occur over a short interval; and
- the detecting of temporal patterns includes associating coincident variates present in the common time series structure.

17. The system of claim 15, wherein detecting temporal patterns in the categorical time series data includes detecting a pattern as defined in configuration data, the pattern defined by a series of categorical values or a number of occurrences of one or more categorical value within a certain period within the categorical time series data.

* * * * *